Jan. 13, 1970   J. N. FIORE ET AL.   3,489,276
METHOD AND APPARATUS FOR ORIENTING ARTICLES
Filed Dec. 7, 1967   2 Sheets-Sheet 1
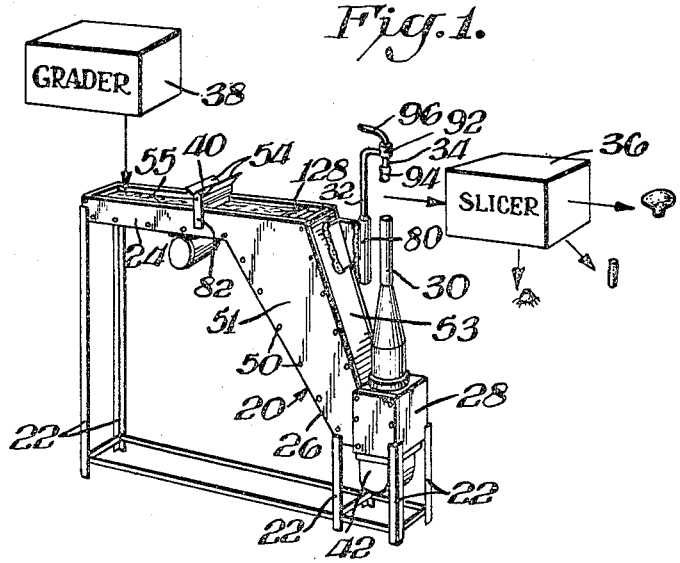
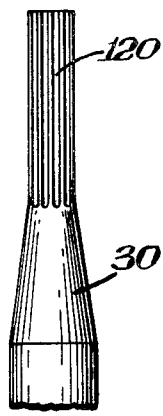
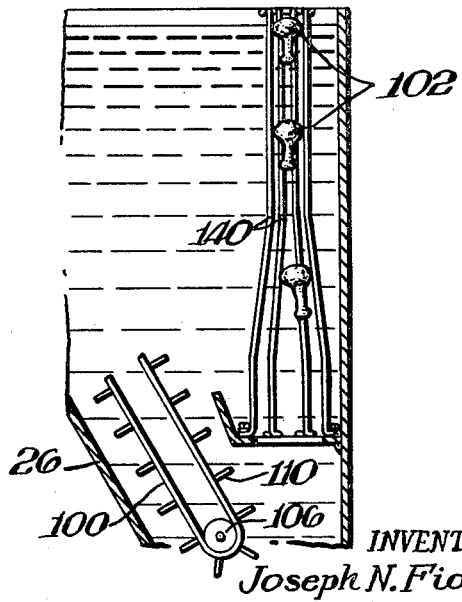

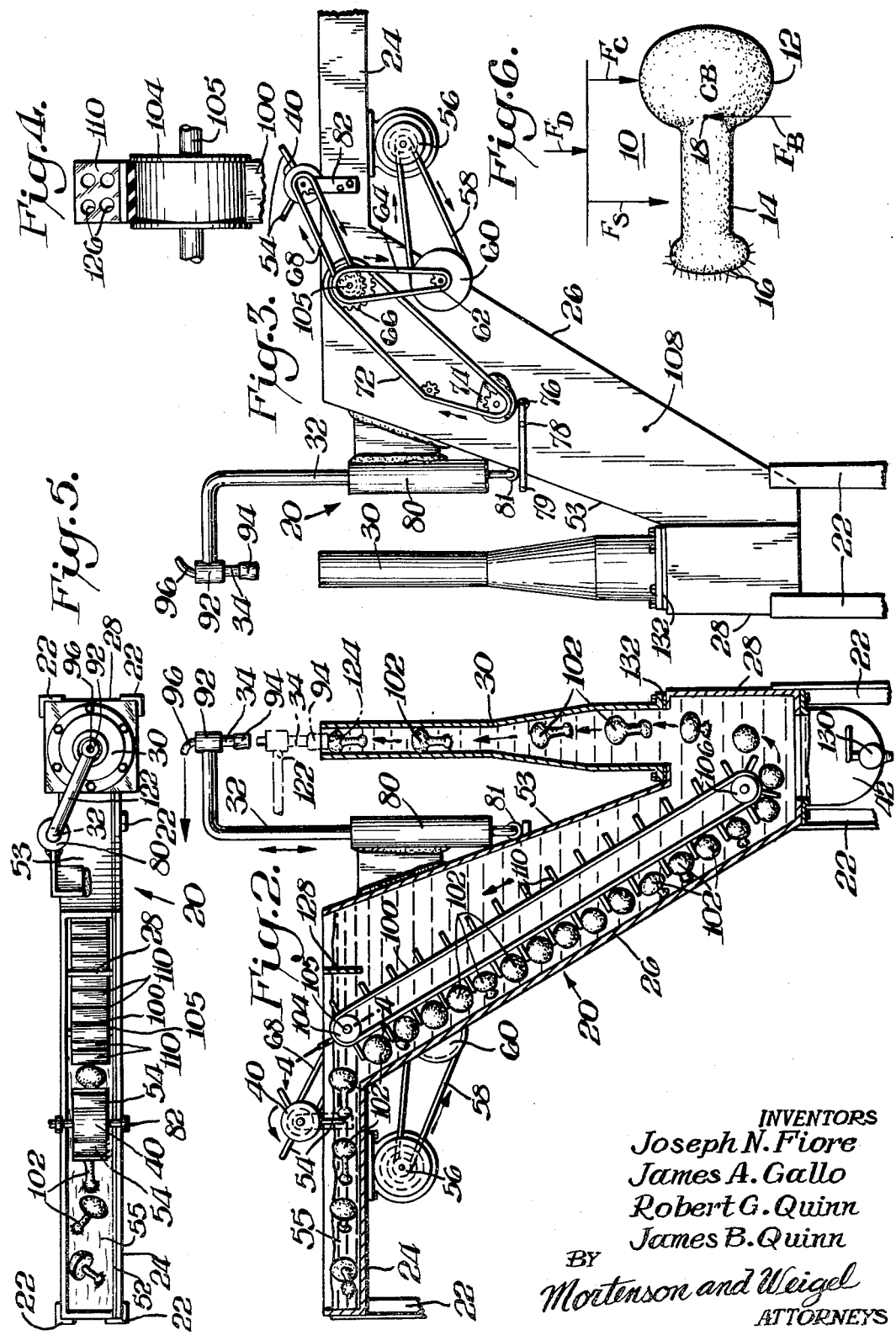

United States Patent Office 3,489,276
Patented Jan. 13, 1970

3,489,276
METHOD AND APPARATUS FOR ORIENTING ARTICLES
Joseph N. Fiore and James A. Gallo, Kennett Square, Robert G. Quinn, University Park, and Jerome B. Quinn, Kennett Square, Pa., assignors to Production Systems, Incorporated, a corporation of Pennsylvania
Filed Dec. 7, 1967, Ser. No. 695,307
Int. Cl. B65g 47/24
U.S. Cl. 209—73                                          24 Claims

ABSTRACT OF THE DISCLOSURE

A method and apparatus are disclosed for orienting articles which are subject to different fluid drag forces according to their geometry as they move through a fluid medium. The invention contemplates submerging these articles in a fluid having a greater density than the articles and permitting the articles to move upwardly toward the fluid's surface. If articles having the same geometry are used, they will arrive at the surface oriented in position, i.e., upside down or rightside up according to their geometry and buoyancy. Upon reaching the surface, the articles are picked off one at a time and fed to a utilization apparatus. Apparatus capable of performing this method including an endless belt which submerges the articles and a hollow restraining tube to aid the articles in maintaining their orientation upon reaching the surface of the fluid. A vacuum pick-off is described for removing the articles from the fluid medium.

This invention relates to a method and apparatus for orienting articles of similar size and shape and, more particularly, to a method and apparatus adapted for use in connection with orienting mushrooms and feeding such oriented mushrooms to a utilization device such as a slicer in which the stem and root bottom are removed, and the cap and stem fed through separate processes for canning, freezing, and the like.

BACKGROUND OF THE INVENTION

In many industries, particularly the food processing industry, it is necessary to feed the food articles, whether they be fruit or vegetable, in single file order, all oriented in the same sense, to various processing machinery. Such processing machinery may, for example, peel the fruit, slice the fruit, core the fruit, or perform similar operations. This is particularly true in the mushroom canning industry. At the present state of the art, mushrooms once picked are dumped onto a conveyor belt which passes down between lines of workers who individually handle each and every mushroom. With a knife in one hand, the workers cut off the very bottom of the root portion of the mushroom which is then discarded into a waste receptacle. Next the worker cuts off the remainder of the stem just below the mushroom cap. The stems are placed in one container for subsequent canning and use in soups, etc. The mushroom caps are placed into a third container for canning and distribution to the prime market.

This hand operation is a laborious, time consuming, expensive operation. A typical worker is unable to process many more than 30 mushrooms per minute over an extended period of time. With this relatively slow rate of production, large numbers of workers are necessary. Since the crops are somewhat seasonal, the workers are not always easy to obtain. There are available automatic mushroom slicing machines, but these generally require that the mushroom be placed in a particular position, usually a V-notch in a chain belt with the cap flush against the side of the chain. The chain moves through a cutting mechanism which performs the desired cutting operation of removing the root from the mushroom and the stem from the cap. If the mushroom is not placed properly within the V-groove, too much or too little will be cut off resulting in excessive wastage. Regardless of the wastage it is essential that the mushroom be positioned within the V-groove in the first instance, all in the same orientation or sense, i.e., with the caps all on one side of the chain. Here again, workers are employed to position the mushrooms with resulting slowness and other problems inherent in such manual operation.

Another problem encountered in the mushroom industry is that the mushrooms cannot undergo rough handling. If subjected to rough treatment the stems tend to break off or the caps break apart. This decreases their value and their processing cost.

It is, therefore, an object of this invention to obviate many of the disadvantages inherent in the manual orienting of articles for processing.

Another object of this invention is to provide an improved method of orienting mushrooms.

Still another object of this invention is to provide an improved apparatus for orienting mushrooms automatically.

SUMMARY OF THE INVENTION

According to the preferred method of this invention articles which present different fluid drag forces thereover according to their geometry are submerged in a fluid medium having a density greater than the density of the articles. The articles are now permitted to float upwardly through the fluid medium during which time they become individually oriented according to their geometry and buoyancy. These articles are individually removed from the fluid medium after they have traversed a sufficient distance to become oriented, usually at the surface of the fluid medium.

One apparatus which is capable of performing this method includes an inclined belt drive which transports the articles usually one-by-one down to a submerged point in a receptacle containing the fluid medium. At the submerged point the articles are released and permitted to float upwardly through a tapered hollow tube of decreasing diameter which restrains the articles against lateral movement after orientation and holds them in a stored position until they are removed from the top of the tapered tube. As they are removed, they are all oriented in the same sense and may be fed to any desired processing apparatus.

BRIEF DESCRIPTION OF THE DRAWINGS

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 1 is a part block, part pictorial view of preferred form of an apparatus capable of performing the method of this invention;

FIGURE 2 is a partial cross-sectional, elevation view of the apparatus illustrated in FIG. 1;

FIGURE 3 is a back elevational view, partially cut off, of the apparatus illustrated in FIG. 1;

FIGURE 4 is a fragmentary end view of a portion of the conveyor mechanism employed in the apparatus illustrated in FIG. 1;

FIGURE 5 is a fragmentary top view of the input portion of the apparatus illustrated in FIG. 1;

FIGURE 6 is a diagrammatic representation of a typical mushroom illustrating the buoyant and drag forces operating thereon;

FIGURE 7 is an elevation view of an alternative restraining mechanism that may be employed in the apparatus illustrated in FIG. 1; and FIGURE 8 is an alternative view of another alternative restraining mechanism that may be employed in the apparatus illustrated in FIG. 1.

DESCRIPTION OF THE PREFERRED EMBODIMENT

According to the preferred method of this invention, any article may be oriented which is subject to relative movement in a fluid medium preferably due to a difference in density between the fluid and the article. Preferably, the article is placed in a fluid in which it is buoyant so that the article rises rather than sinks through the medium, although either approach can be used. Whichever approach is used, each article as it moves either through the fluid or is subjected to relative movement with respect to the fluid becomes oriented by the fluid drag forces according to its geometry. If the articles all have a similar geometry, they orient in the same sense.

According to the preferred method of this invention, the articles are fed in single file fashion at random into a fluid having a greater density than the articles. The articles are submerged within the fluid and permitted to float upwardly therethrough. To insure a rapid rise of the articles, the fluid should be selected to have a density substantially greater than the density of the articles and a relatively low viscosity. As the articles move upwardly through the fluid, they tend to become aligned or oriented to a particular sense according to their geometry. In the case of mushrooms, to which this application refers preferably and for convenience, water is used, and a typical mushroom is shown in FIG. 6, the mushroom including a bulbous cap 12, a stem portion 14 and a root portion 16.

Essentially there are two forces which act on mushrooms. The first of these forces is designated $F_B$ and acts upon a point 18 which may be designated the center of buoyancy (CB) of the mushroom. The center of buoyancy 18 may be determined by any number of analytical means and depends upon the relative density of the mushroom. The center of buoyancy 18 is somewhat analogous to the center of gravity and is the single point at which the buoyancy of the mushroom effectively acts. The quantity or magnitude of the buoyant force is equal to the weight of the volume of water displaced by the mushroom minus the weight of the mushroom itself. Since the density of a mushroom is less than the density of water, it tends to float with the buoyant force $F_B$ directed upwardly as denoted by the arrow. It may be noted that the center of buoyancy in a mushroom is close to the cap 12. The center of buoyancy, or center of gravity when a less dense fluid is used, varies according to the geometry of the article.

The second force acting upon the mushroom as it moves (in this case) upwardly through water is the drag force $F_D$ which acts only when the mushroom is moving through the water. The drag force $F_D$ is dependent upon the viscosity of the fluid medium in which the mushroom is submerged, the geometry of the mushroom, and the mushroom's velocity through the fluid medium. It is expressed by the formula $F_D = -KEV^n$ where K is a constant depending on the geometry of the body, E is the viscosity of the fluid, V is the velocity of the mushroom through the fluid and n is an odd integer.

In the case of the mushroom, the fluid drag force $F_D$ is composed of two primary forces $F_C$ and $F_S$ which act respectively upon the cap 12 and the stem and root portions 14 and 16. These drag forces are considered separately since the constant K differs for a sphere $K_S$ and for a cylinder $K_C$. In particular, $K_S$ is less than $K_C$. This means that for a given velocity, the drag on a cylinder will be more than on a sphere. The drag force $F_S$ acts roughly at the center of the stem 14 and the drag force $F_C$ acts roughly at the center of the cap 12. Since the buoyant force is more than than the drag force where $$F_D = F_C + F_S$$

the mushroom moves upwardly through the water. As the mushroom rises through the water due to its own buoyant force, the drag forces in combination with the buoyant force of the mushroom all co-act to cause the mushroom to rise cap or head first through the water. This may be seen by summing the moments acting about the center of buoyancy 18. Since the force $F_S$ acting on the stem portion exceeds the force $F_C$ acting on the cap portion, the mushroom rotates so as to make the cap 12 lead. Surprisingly this is the case for the vast majority of mushrooms. In fact, even more surprisingly, it has been found that the percentage of mushrooms that do not follow this rule is less than one tenth of one percent. Accordingly, the vast majority of mushrooms submerged in water will rise cap or head first to the surface and then tip over again on its side as it reaches the surface.

If, however, in accordance with this invention the mushroom is either removed from the water immediately upon its reaching the surface or is permitted to rise into a restraining tube or other element, it may be retained in the upright position for later pick off and processing.

The unique advantage of this invention is that all mushrooms may now be quickly and automatically oriented in the position of cap or head up for subsequent processing either by hand or by automatic processing equipment. If desired, a team of mushroom cutters may pluck the mushrooms from the restraining tube and cut their stems and roots with a single swift movement. No orientation step is required since they are all oriented cap up. In the alternative, the mushrooms may be automatically picked off and fed to a slicer or other processing equipment as desired. Since the mushrooms were submerged in single file order and then released in single file order, they rise through the water in the same single file order which is ideal for automatic processing purposes.

The method of this invention may be practiced utilizing a preferred apparatus which will now be described. In FIG. 1 there is seen a receptacle 20 for holding the fluid. For ease of description, the apparatus will be described in conjunction with orienting mushrooms automatically, in which case, the fluid preferably is water. Water is readily and cheaply available and mushrooms easily float in water. The receptacle 20 is supported by a suitable frame 22 and includes an input trough portion 24, a downwardly inclined portion 26, a release portion 28, and an output tapered tube 30 of decreasing diameter into which the mushrooms are released. A pick-off mechanism designated generally 32 removes the mushrooms as they rise cap or head up in the tapered tube 30 by a vacuum pick off 34 from which point they are then fed to a slicer designated by the block 36 or they may be removed from the tube 30 or the pick-off 32 manually all properly oriented. Initially the mushrooms are fed into the trough portion 24 either manually or preferably from a conventional mushroom grader designated by the block 38.

In the grader 38, which is available commercially, the mushrooms are sorted according to size and those of a given size either continuously or periodically introduced into the trough portion 24 either manually or by a conveyor belt (not shown). A paddle wheel 40 moves the mushrooms one at a time into the declining portion 26 of the receptacle 20 for submersion and release into the tapered tube 30 as will be described. A trap 42 at the lower portion of the receptacle 20 catches any broken particles and waste and permits them to be removed or, as desired, permits the entire receptacle holding the water to be drained.

The details of the receptacle's structure and the manner of its operation may be perhaps most clearly seen by reference to FIGS. 2 through 5, inclusive. The receptacle 20 may be constructed out of sheet stock such as stainless steel of appropriate thickness to contain the fluid and the subject apparatus parts. The several sheets or plates which form the sides of the receptacle 20 may be welded together or bolted as illustrated in FIG. 1 by the bolts 50. A sealing gasket 52 (FIG. 5) provides a fluid tight seal between the ends 53 and front side 51 of the receptacle 20. The gasket 52 may be constructed of rubber or any other suitable resilient material which is capable of performing a sealing action. The frame 22 may be constructed of any suitable metal bar stock or other rigid material such as the steel angle irons illustrated for the legs and support braces. When formed, the receptacle 20 includes the trough portion 24 which is a shallow trough capable only of holding fluid of sufficient depth to permit the mushrooms 102 to float freely within the water 55. The shallow trough portion 24 typically may be in the order of one to two feet in length. This length is not critical, its only criteria being that it be of sufficient volume to hold reasonable quantities of mushrooms to be fed into the orienting apparatus. Thus it may be considerably wider and tapered to the inlet of the paddle wheel so as to permit the introduction of only a single mushroom through the paddle wheel at a time.

The paddle wheel 40 is illustrated as having three paddles 54 that are located equi-angularly around its periphery. A paddle wheel having roughly a 3 inch diameter to the paddle tips can accommodate only a single mushroom at a time between any two of the paddles 54. Preferably the paddles 54 are mounted on the periphery of a drum to prevent a mushroom being wedged therebetween. The paddle wheel 40 rotates, in the counterclockwise direction illustrated, when driven by a motor or prime mover 56 (FIG. 2). The driving motor 56 transmits power through a belt 58 (FIG. 3) which drives a pulley 60 rigidly mounted to a spur gear 62. The spur gear acting through a chain linkage 64, drives a gear assembly 66 of several gears all mounted on the same shaft 105 and keyed together to transmit power to the conveyor belt drive drum 104 (FIG. 2) as well as the pick-off mechanism 32 and the paddle wheel 40. The paddle wheel 40 is driven through a chain linkage 68 and the pick-off mechanism 32 is driven through a chain drive 72. The chain drive 72 operates gear driven eccentric cam 74 which engages a cam follower 76. The cam follower 76 is in the form of a lever pivoted as at 78 to provide a reciprocating lever action at its driving end 79 for moving the pick-off mechanism 32 in a reciprocating up and down motion.

The pick-off mechanism 32 is illustrated as comprising an L-shaped rod having a driver end 81 which engages the driving end 79 of the cam follower. The pick-off rod 32 is slidably positioned by a bearing 80 which may be mounted to the outer end wall 53 (FIG. 1) of the receptacle 20 as by welding. The gears 62 and 40 and the gear assembly 66 are keyed to shafts not numbered which are bearing mounted in the side wall 108 of the receptacle 20. The paddle wheel 40 may be mounted as by a bracket 82 bolted or welded to the sides of the input trough 24. Other drive arrangements or mechanisms may be employed as desired, but it is preferred that they be synchronized as is permitted by the chain and gear linkages illustrated so that the input paddle wheel introduces one mushroom for each position of the conveyor belt as will be described.

The L-shaped upper portion of the pick-off mechanism 32 provides a mount for a hollow tube 96 which forms part of the vacuum pick off 34. The lower portion of the tube 96 is secured as by a ring holder 92 or other suitable mechanism on the pick-off mechanism 32 and has attached thereto a flexible, elastic open nipple 94. When the vacuum is applied to the nipple 94 as by a vacuum pump attached to tube 96, and the pick-off lowered, the nipple's open end contacts the mushrooms 102 as they reach the top portion of the tapered tube 30. The vacuum secures the mushrooms to the nipple 94 which is then raised to lift the mushrooms from the water where they may be removed either automatically by a slicer mechanism or manually by an employee. Suction for the tube 90 and the nipple 94 is provided by any suitable vacuum source such as that provided by a blower through the tube 96 or a reciprocating bellows operated in synchronism with the movement of the pick-off mechanism 32.

Near the paddle wheel 40 is a chute-like, downwardly inclined, portion 26 of the receptacle which houses a conveyor belt 100. The conveyor belt 100 functions to submerge the mushrooms 102 and transport them into the release portion 28 where they are released to float upwardly into the tapered tube 30. The tapered tube 30 may, for example, be clear plastic or glass to permit the operator to observe the motion of the mushrooms and to detect a jam up if such does occur. The lower portion of the tapered tube 30 is of large diameter relative to the mushrooms 102. As the mushrooms 102 rise upwardly in the tube, they tend to stay away from the sides of the tube due to fluid flow about the mushrooms. The conveyor belt 100 includes a continuous belt maintained under tension between two spindles 104, 106 which are mounted to the back plate 108 of the receptacle 20. At equally spaced intervals along the exterior or outer portion of the belt 100 are perpendicularly disposed flanges 110. The spacing between the flanges 110 approximates that of the maximum size of a mushroom to be handled in the orienting device.

The spindle 104, driven by the gear arrangement 66 (FIG. 3), is synchronized with the rotation of the paddle wheel 40 so that as each mushroom 102 is passed one at a time through the paddle wheel 40 into the chute region 26 it is engaged by one of the flanges 110 of the conveyor belt 100. It may be seen in FIG. 4 that the flanges 110 protrude sufficiently from the belt 100 so as to trap the mushrooms 102 in the space formed between it and the belt. The mushroom is retained by its own buoyancy attempting to force itself upwardly through the water. A 45° slope for the conveyor belt 100 has been found to function quite satisfactorily, although greater slope angles may be used. Once the slope angle approaches 80°, however, there is a tendency for the mushrooms to become dislodged.

When the mushrooms reach the bottom spindle 106, having been propelled downwardly by the belt 100, they are freed in the release area 28 at a submerged position and now tend to rise upwardly through the water 55 along the axis of the tapered tube 30. Because of the geometry of the mushroom in combination with its own buoyancy, the mushrooms 102 tend to right themselves with the cap or head end up and rise upwardly through the tube 30. As they approach the constricted portion of the tube 30, they tend to be centered along the axis of the tube and achieve a stacked array as is noted in the upper portion of the drawing of FIG. 2 awaiting removal from the top end of the tapered tube 30.

Removal is achieved by the reciprocating lift mechanism 32 which preferably is geared to operate at a higher repetition frequency than the mushrooms are released by the conveyor belt 100, thereby to reduce the possibility of blockage. The suction or vacuum applied to the tube 96 which communicates with the lifting nipple 94 operates such that when the lifting mechanism 32 is at the lower end of its stroke, as indicated by the dash-dot line showing 122 (FIG. 2), the nipple 94 comes in contact with the uppermost mushroom 124 in the tapered tube 30. Because of the suction, the mushroom is withdrawn from the tube with the next upward cycle of the lifting mechanism 32 to be removed by the slicer pick off mechanism or manually by a person whose function it would then be to slice the mushroom.

The slicer mechanism, by way of example, may include a U-shaped or V-shaped groove which is synchronized with the motion of the pick-off mechanism 32 so as to engage the mushroom, after it is lifted from the tube 30, in the V-shaped groove and to move it against a knife for slicing. Other alternative schemes may be used as desired. Since the slicing or other automatic processing does not constitute a portion of this invention it will not be described in greater detail.

If desired, each of the flanges 110 (FIG. 4) on the belt may have holes 126 formed therein to facilitate their motion through the water without creating undesired turbulence conditions which might cause the mushrooms 102 to become dislodged during their submersion. A baffle plate 128 (FIG. 2) is mounted against the back wall 108 of the chute-like submersion chamber 20 to prevent any mushrooms from returning to the upper portion of the chute rather than rise through the tapered tube 30 as intended. The baffle 128 would collect such mushrooms in the front portion of the chute 20. A valve 130 may be positioned in the lower portion of element 42 to facilitate emptying the tank or draining it.

In the embodiment illustrated in FIG. 1 the tapered tube 30 may be a glass tube the flanged lower portion of which is bolted to the release portion 28 of the receptacle 20 with an appropriate sealing gasket 132 (FIG. 2) to provide a water tight seal. In alternative embodiments it may be, for example, completely submerged in water as in FIG. 8 and may be comprised of vertically extending wires or rod-like members 140 which together form a tapered tubular type arrangement through which the mushrooms may rise. In the event that this open device is used, the lateral restraining member or tube 30 would then be included as part of the receptacle 20 and be completely submerged in the water itself.

In other alternative embodiments (FIG. 7) the tube 30 may be tapered but may be corrugated vertically at 120 so as to facilitate the movement of the mushrooms in an upward direction. Such vertical corrugations are formed most simply by rolling the corrugations into a piece of metal sheet stock and forming the sheet into a hollow cylindrical configuration. The mechanism which prevents the mushrooms from coming in close contact with the side walls of the tube is the fluid flow about the mushroom as it moves upwardly through the narrow constricted corrugated portion 120 of the tube 30. The vertically disposed corrugations provide a greater cross-sectional area through which the water may move to permit the upward movement of the mushrooms and yet afford the lateral restriction as desired.

While this invention has been described in conjunction with orienting mushrooms in water it is quite obvious that the application has broad application to any other articles which may be submerged in a fluid having a density either greater or less than that of the articles. The articles become oriented during their movement through the fluid in accordance with their geometry which determines their center of buoyancy or gravity and the drag forces. In the case of mushrooms the combination of the drag forces as well as the buoyant forces tend to cause the mushroom to right itself during such rise. Other food articles behave according to their particular geometrics.

The diameter of the restricted portion 120 of the tube 30 should be slightly greater then the largest diameter of the mushrooms or other articles in their oriented position that are to be introduced. It is desirable that the mushrooms be graded prior to introduction into this orienting apparatus since this aids in permitting the tube 30 to retain the mushrooms in an upright position as they stack in the narrow portion of the tube. If mushrooms that are considerably smaller in cap diameter than the diameter of the tube 30 are used and they tend to become stacked, such mushrooms turn sideways and their orientation is lost. It has been found that the device of this invention will operate satisfactorily with mushrooms having cap diameters or other articles having a maximum diameter as measured transversely to its vertically oriented axis which are less than the tube diameter by as much as $5/16''$ and more. For example, if mushrooms having a nominal cap diameter of 1½ inches are employed, the tube 30 may have an inside diameter in its restricted portion of 1¾ inches and desirably may accommodate mushrooms ranging from $1 3/16$ inches to $1 11/16$ inches.

While a vacuum pick-off is illustrated, it is to be understood that other pick-off may be used as well. For example, a mechanical pick-off having "fingers" for engaging and lifting the mushrooms may be employed.

There has thus been described a novel method and apparatus for orienting articles. The process includes submerging the articles in a fluid medium more dense than the articles themselves. The articles will then rise up through the fluid medium and become oriented in accordance with their geometry.

It will be obvious that various modifications may be made in the apparatus and in the manner of operating it.

What is claimed is:
1. A method of orienting articles comprising:
introducing said articles into a fluid medium having a density different than the density of said articles,
permitting said articles to move through said fluid medium in a sense determined by their relative densities, whereby said articles become individually oriented during movement by drag forces exerted by said fluid on said articles according to their geometry, and
removing said oriented articles from said fluid medium.
2. A method of orienting articles comprising:
introducing said articles one at a time into a submerged position in a fluid medium having a density greater than the density of said articles,
permitting said articles to float upwardly through said fluid medium to its surface, thereby becoming individually oriented according to their geometry and buoyancy, and
removing said oriented articles from said fluid medium.
3. A method according to claim 2 wherein said articles are mushrooms having a cap end and a stem end and said fluid medium is water, whereby said mushrooms are oriented cap end up.
4. A method according to claim 2 wherein the step of introducing said articles into a submerged position includes:
first feeding said articles one at a time into said fluid medium, and
then submerging said articles in said fluid medium thereby to reduce turbulence in said medium and damage to said articles.
5. A method according to claim 4 wherein the step of permitting said articles to float upwardly includes:
releasing said articles from said submerged position at a lateral location lying substantially on the vertical axis of a member having lateral restraining walls at least partially submerged in said fluid medium, whereby said articles are at least partially restrained from lateral movement while rising.
6. A method according to claim 2 which includes the initial step of sorting said articles according to size, and then introducing only articles of one of said sizes into said submerged position.
7. A method according to claim 6 wherein said articles are mushrooms having a cap end and a stem end and said fluid medium is water, whereby said mushrooms are oriented cap end up.
8. A method according to claim 7 wherein the step of introducing said articles into a submerged position includes:
first feeding said articles one at a time into said fluid medium, and
then submerging said articles in said fluid medium, thereby to reduce turbulence in said medium and damage to said articles.
9. A method according to claim 8 wherein the step of permitting said articles to float upwardly includes:

releasing said articles from said submerged position at a lateral location lying substantially on the vertical axis of a member having lateral restraining walls at least partially submerged in said fluid medium, whereby said articles are at least partially restrained from lateral movement while rising.

10. A method for orienting articles which are subject to different fluid drag forces thereover according to their geometry through the use of a fluid having a density different than that of the articles which method comprises:
   placing said articles in a fluid in a container having an outlet for the oriented articles,
   passing said articles one at a time to a position in respect to said outlet which position affords subjecting the passed articles to the drag forces of said fluid, and
   allowing said articles to pass from said position to said outlet with relative movement between said articles and said fluid, thereby to orient said articles according to said fluid drag forces.

11. A method in accordance with claim 10 which includes the step of individually removing the said oriented articles from said outlet.

12. A method in accordance with claim 11 which includes the step of passing the removed article to another processing area.

13. A method in accordance with claim 10 in which said articles are mushrooms.

14. Apparatus for orienting articles which are subject to different fluid drag forces thereover according to their geometry as they move through a fluid medium comprising:
   a receptacle adapted to contain said fluid medium, said fluid medium having a density greater than the density of said articles,
   means for introducing said articles one at a time into a submerged position in said fluid medium, and
   means for releasing said articles upon reaching said submerged position, whereby said articles move upwardly through said medium and become oriented according to their geometry and buoyancy.

15. An apparatus according to claim 14 wherein said articles are mushrooms having a cap end and a stem end and said fluid medium is water, whereby said mushrooms are oriented cap end up.

16. An apparatus according to claim 15 wherein said introducing means includes:
   a downwardly inclined endless conveyor belt having a plurality of projecting flange-like members spaced apart to engage said articles, said receptacle having vertically disposed restraining walls spaced on either side of said belt thereby to define together with each of said flange-like members and belt a scoop-like member adapted to move a single article introduced to the underside of said belt from the surface of said liquid medium to said submerged position.

17. An apparatus according to claim 16 wherein said means for releasing said mushrooms includes an elongated restraining member positioned above said submerged position and adapted to restrain substantial lateral movement of said mushrooms during said upward movement.

18. An apparatus according to claim 17 wherein said restraining member comprises tapered hollow tube of decreasing diameter.

19. An apparatus according to claim 17 wherein said restraining member comprises a hollow tube having vertically corrugated walls thereby to permit the free movement of said mushrooms therethrough.

20. Apparatus for orienting articles through the use of a fluid which comprises:
   a container for said fluid which has an outlet having a diameter slightly larger than the largest diameter of the articles in their oriented position,
   means for placing said articles in said container, and
   means for releasing said articles one at a time in said fluid in a manner to allow each article to pass through said fluid to said outlet and to be subjected in said passage to the orienting forces of said fluid.

21. Apparatus in accordance with claim 20 which includes means for individually removing the articles from said outlet.

22. Apparatus in accordance with claim 20 wherein said releasing means comprises a conveyor belt.

23. Apparatus in accordance with claim 22 which includes as part of said placing means, a rotating element that feeds said articles one at a time to said conveyor belt.

24. Apparatus in accordance with claim 22 in which said conveyor belt effects the release of said articles in a submerged position with respect to said outlet.

References Cited

UNITED STATES PATENTS 1,711,051  4/1929  Gates _____ 198—33

ALLEN N. KNOWLES, Primary Examiner

U.S. Cl. X.R.

198—33